United States Patent [19]

McDonald et al.

[11] Patent Number: 4,496,174
[45] Date of Patent: Jan. 29, 1985

[54] INSULATED DRILL COLLAR GAP SUB ASSEMBLY FOR A TOROIDAL COUPLED TELEMETRY SYSTEM

[75] Inventors: William J. McDonald; William C. Maurer; David D. Nagel, all of Houston, Tex.

[73] Assignee: Tele-Drill, Inc., Richardson, Tex.

[21] Appl. No.: 229,800

[22] Filed: Jan. 30, 1981

[51] Int. Cl.³ .............................................. F16L 11/12
[52] U.S. Cl. ...................................... 285/53; 285/55; 285/330; 285/333; 285/370; 324/356
[58] Field of Search ........................ 285/48, 50, 53, 55, 285/333, 334, 355, 370, 330, 391, 360, 376; 174/85, 75 R; 324/356, 366, 369; 64/9 R

[56] References Cited

U.S. PATENT DOCUMENTS

| | | | |
|---|---|---|---|
| 1,110,947 | 9/1914 | Lampert | 285/50 |
| 2,320,107 | 5/1943 | Speckert | 285/333 X |
| 2,364,957 | 12/1944 | Douglas | 324/356 X |
| 2,515,366 | 7/1950 | Zublin | 285/330 X |
| 2,656,857 | 10/1953 | Cavallier | 285/355 X |
| 2,917,704 | 12/1959 | Aeps | 324/356 X |
| 2,940,787 | 6/1960 | Goodner | 285/355 X |
| 3,101,207 | 8/1963 | Pavel et al. | 285/355 X |
| 3,489,437 | 1/1970 | Duret | 285/55 X |
| 3,811,710 | 5/1974 | Dula et al. | 285/355 X |

FOREIGN PATENT DOCUMENTS

| | | | |
|---|---|---|---|
| 22635 | 5/1935 | Australia | 285/50 |
| 392827 | 5/1933 | United Kingdom | 285/333 |
| 836825 | 6/1960 | United Kingdom | 285/55 |

*Primary Examiner*—Dave W. Arola
*Attorney, Agent, or Firm*—John J. Byrne; Bradford E. Kile; Kevin M. O'Brien

[57] ABSTRACT

An insulated drill collar gap sub assembly for a toroidal coupled telemetry system including a first annular sub member (150) operable to be connected at one end to a drill collar and a second annular sub member (156) operable to form a part of a drill collar sub. The first and second annular sub members have interconnecting structural members (54, 58) operable to structurally interfere. The interconnecting structural members are dimensioned to form a continuous gap (160) between mutually opposing surfaces and a dielectric material (162) fills the gap to electrically isolate the first annular sub member with respect to the second annular sub member. A bearing member (164) is positioned between the first annular member and the second annular member and is coated with a dielectric insulation (166) to facilitate the formation of a drill collar gap sub assembly of structural and electrical integrity.

13 Claims, 15 Drawing Figures

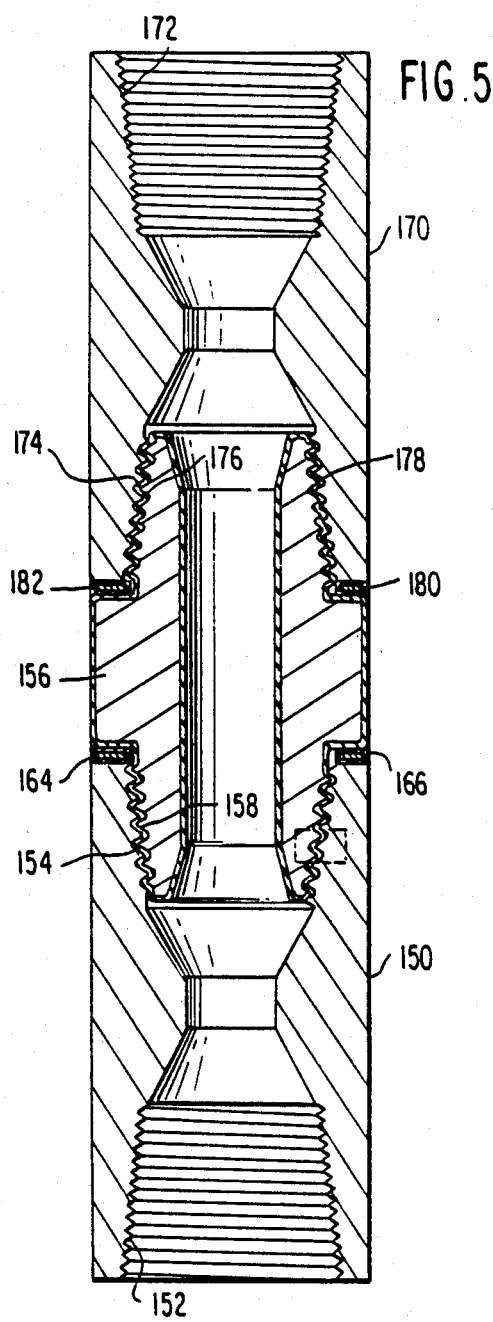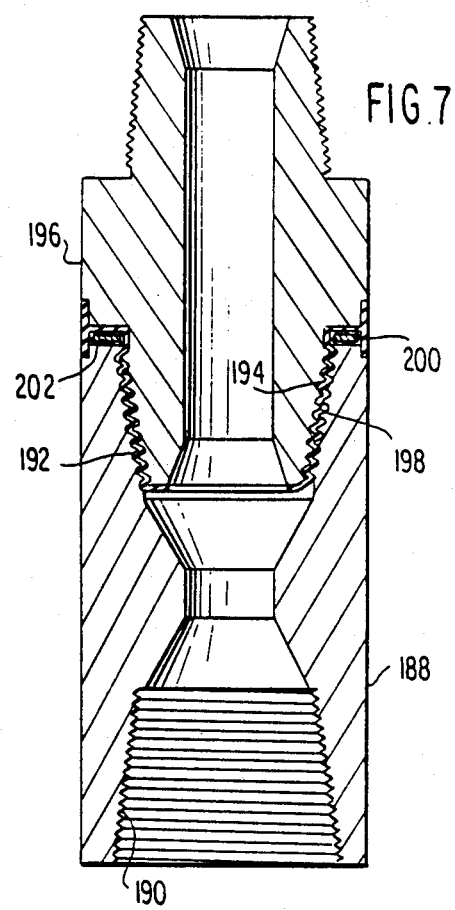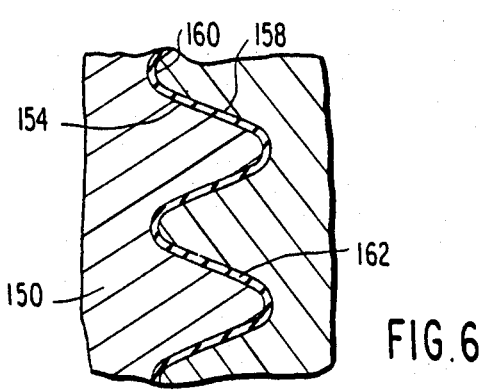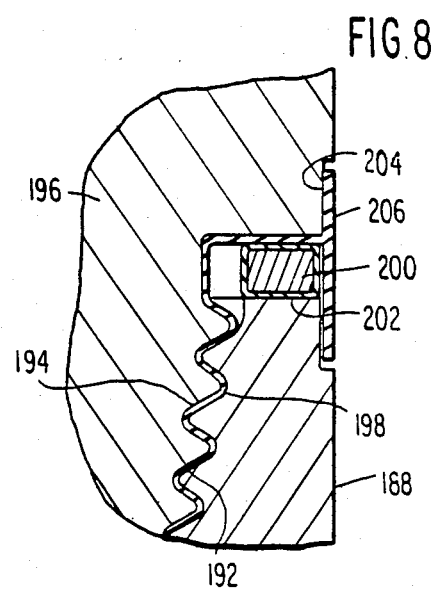

INSULATED DRILL COLLAR GAP SUB ASSEMBLY FOR A TOROIDAL COUPLED TELEMETRY SYSTEM

BACKGROUND OF THE INVENTION

This application relates to an apparatus for facilitating measuring bore hole data and for transmitting the data to the surface for inspection and analysis. Although the subject invention may find substantial utility at any stage in the life of a borehole, a primary application is in providing real time transmission of large quantities of data simultaneously while drilling. This concept is frequently referred to in the art as downhole measuring while drilling or simply measuring while drilling (MWD).

The incentives for downhole measurements during drilling operations are substantial. Downhole measurements while drilling will allow safer, more efficient, and more economic drilling of both exploration and production wells.

Continuous monitoring of downhole conditions will allow immediate response to potential well control problems. This will allow better mud programs and more accurate selection of casing seats, possibly eliminating the need for an intermediate casing string, or a liner. It also will eliminate costly drilling interruptions while circulating to look for hydrocarbon shows at drilling breaks, or while logs are run to try to predict abnormal pressure zones.

Drilling will be faster and cheaper as a result of real time measurement of parameters such as bit weight, torque, wear and bearing condition. The faster penetration rate, better trip planning, reduced equipment failures, delays for directional surveys, and elimination of a need to interrupt drilling for abnormal pressure detection, could lead to a 5 to 15% improvement in overall drilling rate.

In addition, downhole measurements while drilling may reduce costs for consumables, such as drilling fluids and bits, and may even help avoid setting pipe too early. Were MWD to allow elimination of a single string of casing, further savings could be achieved since smaller holes could be drilled to reach the objective horizon. Since the time for drilling a well could be substantially reduced, more wells per year could be drilled with available rigs. The savings described would be free capital for further exploration and development of energy resources.

Knowledge of subsurface formations will be improved. Downhole measurements while drilling will allow more accurate selection of zones for coring, and pertinent information on formations will be obtained while the formation is freshly penetrated and least affected by mud filtrate. Furthermore, decisions regarding completing and testing a well can be made sooner and more competently.

There are two principal functions to be performed by a continous MWD system: (1) downhole measurements, and (2) data transmission.

The subject invention pertains to an element of the data transmission aspect of MWD. In the past several systems have been at least theorized to provide transmission of downhole data. These prior systems may be descriptively characterized as: (1) mud pressure pulse, (2) insulated conductor, (3) acoustic and (4) electromagnetic waves.

In a mud pressure pulse system the resistance to the flow of mud through a drill string is modulated by means of a valve and control mechanism mounted in a special drill collar sub near the bit.

The communication speed is fast since the pressure pulse travels up the mud column at or near the velocity of sound in the mud, or about 4,000 to 5,000 fps. However, the rate of transmission of measurements is relatively slow due to pulse spreading, modulation rate limitations, and other disruptive limitations such as the requirement of transmitting data in a fairly noisy environment.

Insulated conductors, or hard wire connection from the bit to the surface, is an alternative method for establishing down hole communications. The advantages of wire or cable systems are that: (1) capability of a high data rate; (2) power can be sent down hole; and (3) two way communication is possible. This type of system has at least two disadvantages; it requires a wireline installed in or attached to the drill pipe and it requires changes in usual rig operating equijpment and procedures.

One hardwire method is to run an electrical connector cable to mate with sensors in a drill collar sub. The trade off or disadvantage of this arrangement is the need to withdraw the cable, then replace it each time a joint of drill pipe is added to the drill string. In this and similar systems the insulated conductor is prone to failure as a result of the abrasive conditions of the mud system and the wear caused by the rotation of the drill string. Also, cable techniques usually entail awkward handling problems, especially during adding or removing joints of drill pipe.

As previously indicated, transmission of acoustic or seismic signals through a drill pipe, mud column, or the earth offers another possiblity for communication. In such systems an acoustic (or seismic) generator would be located near the bit. Power for this generator would have to be supplied downhole. The very low intensity of the signal which can be generated downhole, along with the acoustic noise generated by the drilling system, makes signal detection difficult. Reflective and refractive interference resulting from changing diameters and thread makeup at the tool joints compounds the signal attenuation problem for drill pipe transmission. Moreover signal-to-noise limitations for each acoustic transmission path are not well defined.

The last major previously known technique comprises the transmission of electromagnetic waves through a drill pipe and the earth. In this connection electromagnetic pulses carrying downhole data are input to a toroid positioned adjacent a drill bit. A primary winding, carrying the data for transmission, is wrapped around the toroid and a secondary is formed by the drill pipe. A receiver is connected to the ground at the surface and the electromagnetic data is picked up and recorded at the surface.

In conventional drillstring toroid designs a problem is encountered in that an outer sheath which must protect the toroid windings must also provide structural integrity for the toroid. Since the toroid is located in the drill collar, large mechanical stresses will be imposed on it. These stresses include tension, compression, torsion and column bend. This structural problem is exascerbated when it is realized that the conductive drill collar is attached at both ends to the outer sheath of the toroid. Such structure will thus provide, a path for a short circuited turn. Accordingly it is essential to provide an insulation gap in the drill collar notwithstanding severe environmental loading.

The problems and unachieved desires set forth in the foregoing are not intended to be exhaustive but rather are representative of the severe difficulties in the art of transmitting borehole data. Other problems may also exist but those presented above should be sufficient to demonstrate that room for significant improvement remains in the art of transmitting borehole data.

In the above connection, notwithstanding substantial economic incentives, and significant activity and theories by numerous interests in the industry, applicants are not aware of the existence of any commercially available system for telemetering while drilling substantial quantities of real time data from a borehole to the surface.

OBJECTS OF THE INVENTION

It is therefore a general object of the invention to provide a novel apparatus for use in a system to advantageously telemeter large quantities of real time data from a borehole to the surface.

It is a particular object of the invention to provide a toroidal coupled, data transmission system wherein the normal functioning of a conventional drill collar is not disturbed.

It is a related object of the invention to provide a novel toroidal coupled, data transmission system wherein the drill collar is provided with an electrical isolation sub to prevent short circuiting the secondary of the data transmission system.

It is a further object of the invention to provide a novel electrical isolation sub and structural assembly for a MWD drill collar which is highly rugged and practical for sustained downhole operation while concomitantly providing a toroidal coupled real time data transmission system.

BRIEF SUMMARY OF THE INVENTION

A preferred form of the invention which is intended to accomplish at least some of the foregoing objects comprises a first annular sub member operable to be connected at one end to a drill collar and a second annular sub member operable to form a part of a drill collar sub. The first and second annular sub members have interconnecting structural members operable to structurally interfere. The interconnecting structural members are dimensioned to form a continuous gap between mutually opposing surfaces and a dielectric material fills the gap to electrically isolate the first annular sub member from the second annular sub member.

THE DRAWINGS

Other objects and advantages of the present invention will become apparent from the following detailed description of preferred embodiments thereof taken in conjunction with the accompanying drawings, wherein:

FIG. 5 is a side view of an insulated gap sub assembly in accordance with one preferred embodiment of the invention;

FIG. 6 is a detailed view of sinusoidal insulated threads of the insulated gap sub depicted in FIG. 5;

FIG. 7 is a sectional side view of an insulated gap sub asseembly in accordance with a second preferred embodiment of the invention;

FIG. 8 is a partial sectional view of the insulated gap sub depicted in FIG. 7 disclosing structural details a bearing member;

DETAILED DESCRIPTION

Figure 1:
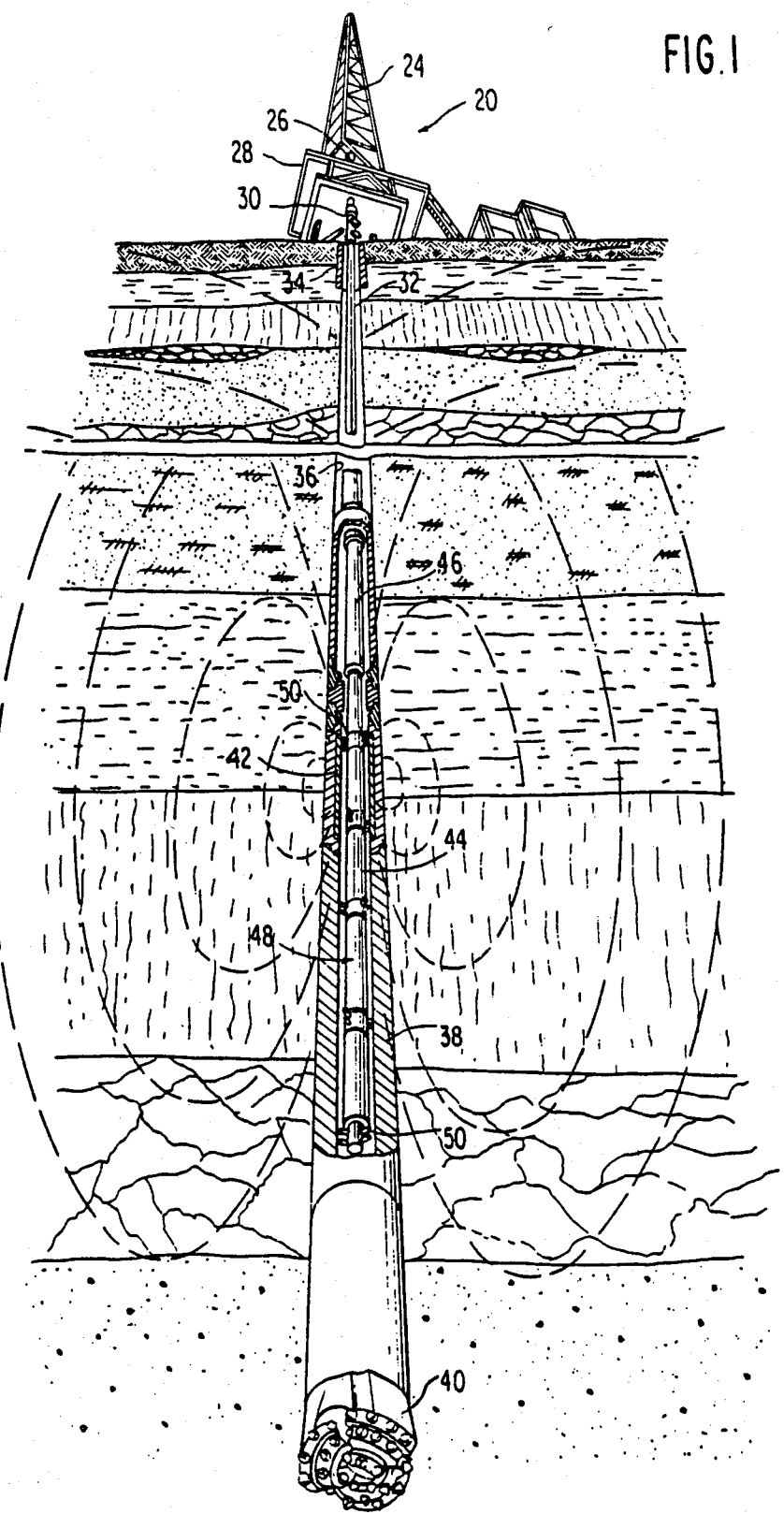
FIG. 1 is a perspective view from the downhole end of a drill string disclosing a drill collar and a toroidal coupled MWD system for continuously real time data to the surface.

Referring now to the drawings, wherein like numerals indicate like parts, there will be seen various views of a toroidal coupled, MWD telemetry system in which the subject invention has particular application and detail views of preferred embodiments of insulated drill collar gap sub assemblies in accordance with the subject inven- tion.

Context of the Invention

Before providing a detailed description of the subject structural assemblies it may be worthwhile to outline the context of the instant invention. In this connection and with reference to FIG. 1 there will be seen a conventional rotary rig 20 operable to drill a borehole through variant earth strata. The rotary rig 20 includes a mast 24 of the type operable to support a traveling block 26 and various hoisting equipment. The mast is supported upon a substructure 28 which straddles annular and ram blowout preventors 30. Drill pipe 32 is lowered from the rig through surface casing 34 and into a borehole 36. The drill pipe 32 extends through the bore hole to a drill collar 38 which is fitted at its distal end with a conventional drill bit 40. The drill bit 40 is rotated by the drill string, or a submerged motor, and penetrates through the various earth strata.

The drill collar 38 is designed to provide weight on the drill bit 40 to facilitate penetration. Accordingly such drill collars typically are composed with thick side walls and are subject to severe tension, compression, torsion, column bending, shock and jar loads. In the subject system, the drill collar further serves to enhouse a data transmit toroid 42 comprising a winding core for a downhole data telemetering system. Finally the subject drill collar 38 also functions as a support to hang a concentrically suspended telemetering tool 44 operable to detect and transmit downhole data to the surface concomitantly with normal operation of the drilling equipment.

The telemetering tool 44 is composed of a number of sections in series. More specifically a battery pack 46 is followed by a sensing and data electronics transmission section 48 which is concentrically maintained and electrically isolated from the interior of the drill collar 38 by a plurality of radially extending fingers 50 composed of a resilient dielectric material.

Figure 2:
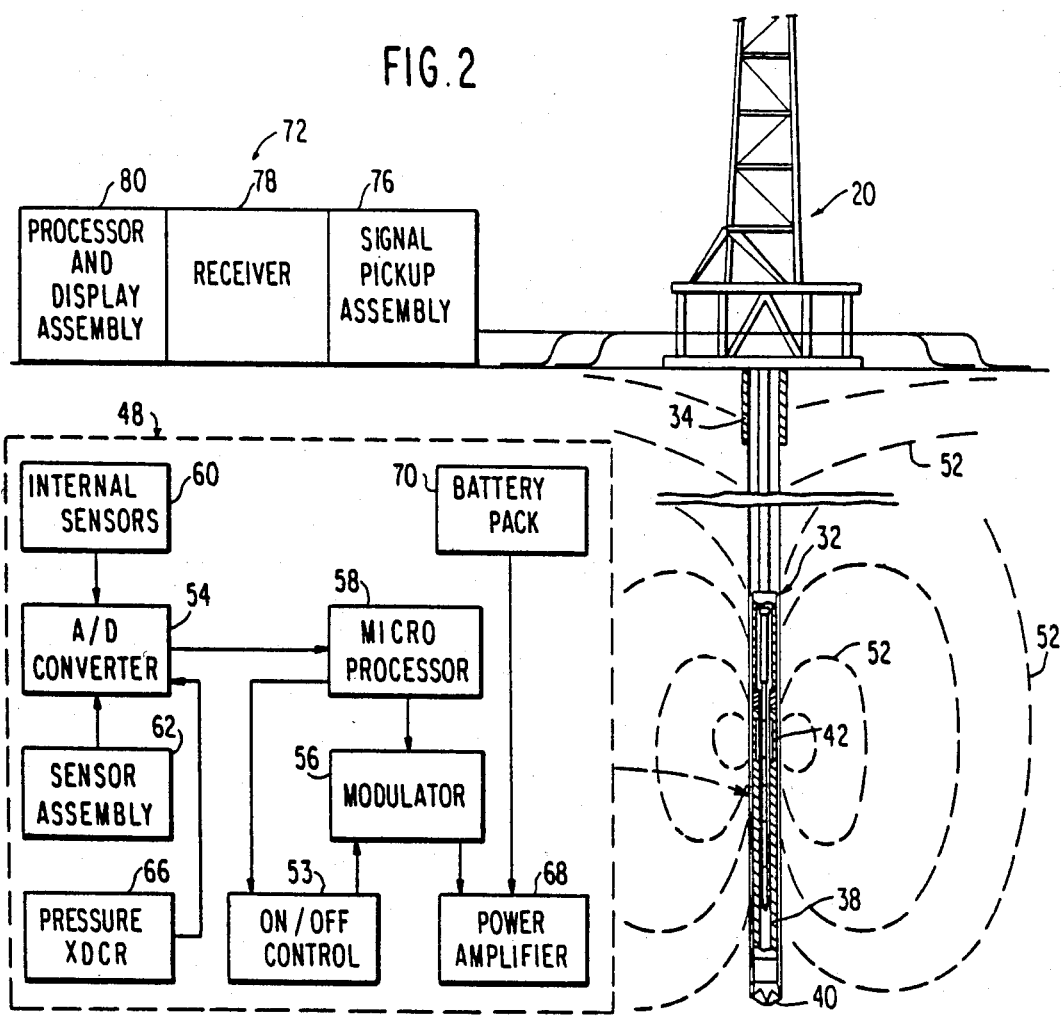
FIG. 2 is a schematic view of the MWD telemetering system disclosed in FIG. 1 including a block diagram of a downhole electronic package which is structurally internal to the drill collar and an uphole signal pickup system.
Figure 3:
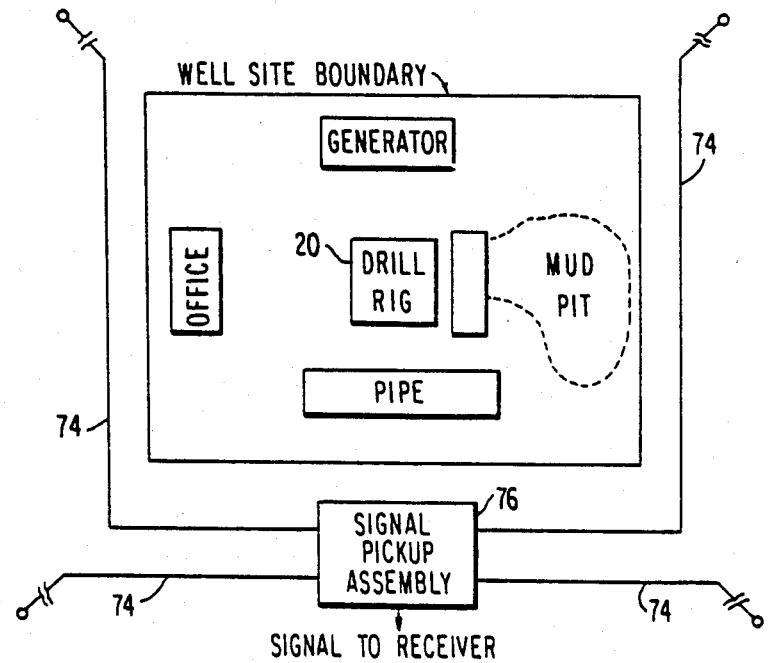
FIG. 3 is a plan view of the uphole system for picking up MWD data signals.

Turning now to FIGS. 2 and 3, there will be seen system diagrams for a toroidal-coupled MWD telemetry system. In this system drill bit, environmental and/or formation data is supplied to the tool data electronics sections 48. This section includes an on/off control 52, an A/D converter 54, a modulator 56 and a microprocessor 58. A variety of sensors 60, 62 etc. located throughout the drill string supply data to the electronics section 48.

Upon receipt of a pressure pulse command 66, or expiration of a time-out unit, whichever is selected, the electronics unit will power up, obtain the latest data from the sensors, and begin transmitting the data to a power amplifier 68.

The electronics unit and power amplifier are powered from nickel cadmium batteries 70 which are configured to provide proper operating voltage and current.

Operational data from the electronics unit is sent to the power amplifier 68 which establishes the frequency, power and phase output of the data. The data is then shifted into the power amplifier 68. The amplifier output is coupled to the data transmit toroid 42 which electrically approximates a large transformer wherein the drill string 32 is a part of the secondary.

The signals launched from the toroid 42 are in the form of electromagnetic wave fronts 52 traveling through the earth. These waves eventually penetrate the earth'surface and are picked up by an uphole system 72.

The uphole system 72 comprises radially extending receiving arms 74 of electrical conductors. These conductors are laid directly upon the ground surface and may extend for three to four hundred feet away from the drill site. Although the generally radial receiving arms 74 are located around the drilling platform, as seen in FIG. 3, they are not in electrical contact with the platform or drill rig 20.

The radial receiving arms 74 intercept the electromagnetic wave fronts 52 and feed the corresponding signals to a signal pickup assembly 76 which filters and cancels extraneous noise which has been picked up, amplifies the corresponding signals and sends them to a low level receiver 78.

A processor and display system 80 receives the raw data output from the receiver, performs any necessary calculations and error corrections and displays the data in a usable format.

Figure 4:
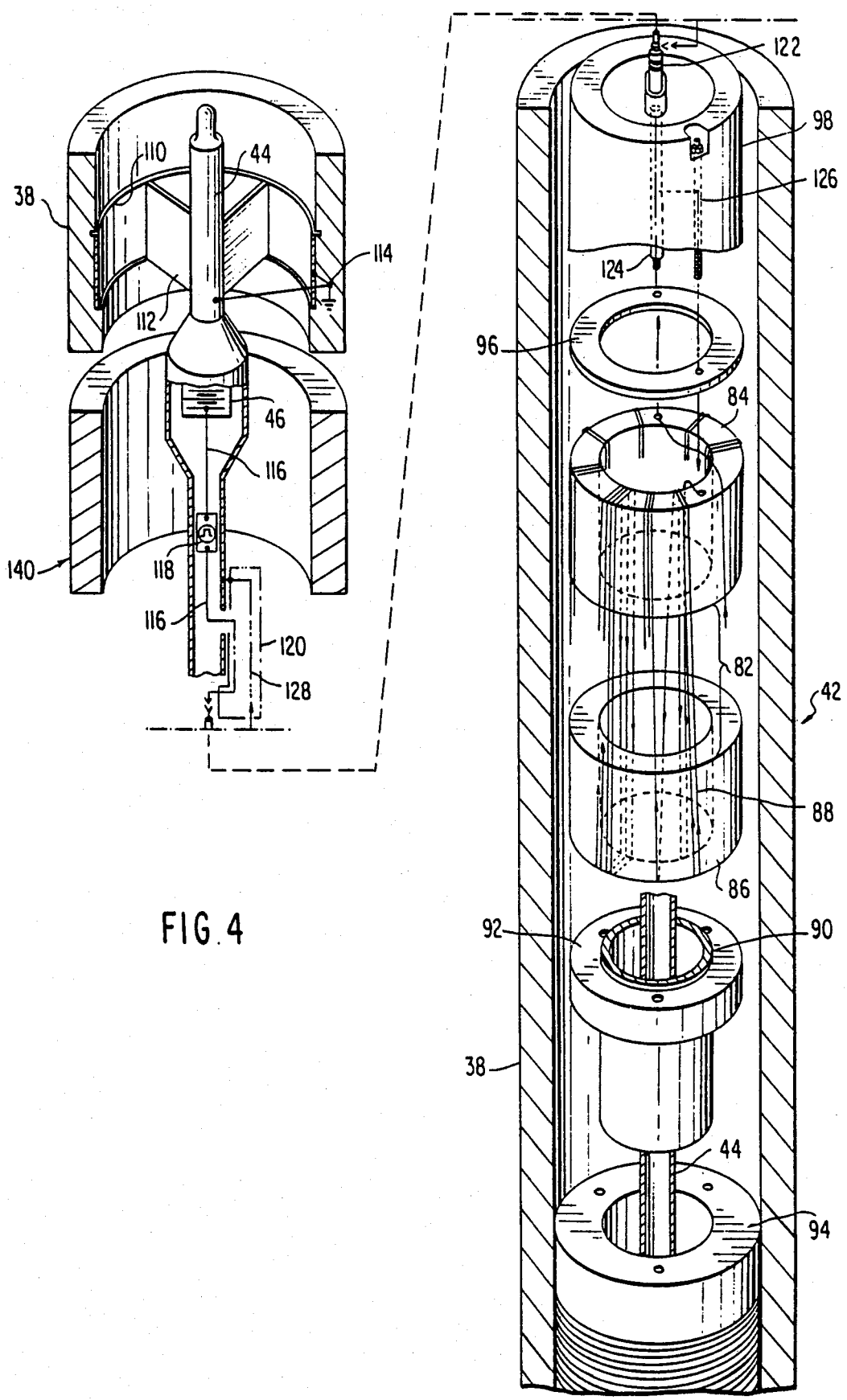
FIG. 4 is an exploded, schematic view of a toroid unit for use in the subject MWD system including a schematic representation of an insulated gap sub assembly in accordance with the subject invention.

Referring now to FIG. 4 there will be seen a broken away, partial detail partial schematic view of the previously noted data transmit toroid 42. In this view the toroid is composed of a plurality of cylindrical members (not shown) which are positioned in area 82. An upper termination block 84 and lower termination block 86 illustrates the configuration of the intermediate toroids. The cylindrical toroids cores are composed of a ferromagnetic material such as silicon steel, permalloy, etc.

The termination blocks are composed of aluminum with an insulation coating and serve to hold the intermediate toroid cores in position and provide end members to receive a primary toroid winding 88.

The toroid package is mounted about a mandrel 90 which extends up through the toroid collars. In FIG. 4, however, the mandrel is broken away to better illustrate the primary winding 88 of the toroid. The mandrel 90 has a radially extending flange 92 which rests upon and is bolted to a bottom sub 94 connected to the drill collar. A similar support arrangement, not shown is provided above an insulated space ring 96 and an electrical connector block assembly 98 to fixedly secure and joint the toroid section 42 to the drill collar 38. In substance thereby the toroid becomes a part of the drill collar and drilling mud flows in an uninterrupted path through the center of mandrel 90 to permit a continuous drilling operation.

As previously indicated a telemetering tool 44 is designed to be positioned within the drill collar 38 and hangs from the drill collar by a landing connector 110 having radial arms 112 connected to an upper portion of the tool 44.

The battery pack 46 is schematically shown encased within an upper segment of tool 44. A negative of the battery pack is connected to the tool 44 which is in direct electrical communication to the drill collar 38 and drill pipe 34, note the schematic representation at 114. The positive terminal of the battery pack 46 extends along line 116 to a data source schematically depicted at 118. The data to be transmitted is input to the toroid system at this point.

The line 116 then feeds into an electrical connector guide, schematically shown at 120. The guide may be a spider support arrangement which the tool slides into to establish an electrical couple between line 116 and electrical connector 122. The line then passes through a cylindrical insulation sleeve 124 and connects directly to the primary 88 of the toroid assembly 42. The other end of the toroid primary extends through the electrical connector block housing 98 at 126 and connects to an outer sheath of the electrical connector 122 which is in communication with the too outer sheath through line 128 and thus back to ground in the drill collar at 114.

The secondary of the toroid transmit system is composed of the drill collar 38 and drill string 32. In order to prevent a short turn through the drill collar it is necessary to provide an insulated zone 140 in the drill collar. As previously indicated, however, the drill collar must also be structurally rugged and capable of withstanding tremendous down-hole forces of tension, compression, torque, column bend, vibration and jarring on a sustained basis, in order to provide a normal drilling function.

Insulated Gap Assembly

The subject invention is directed to novel insulated gap sub assemblies which are capable of providing electrical isolation to permit operation of continuous MWD, toroidal coupled, telemetering while maintaining the critical structural integrity of a drill collar.

Referring now specifically to FIGS. 5 and 6 there will be seen a first preferred embodiment of the subject insulated drill collar gap sub. More specifically a first annular sub member 150 is shown in cross-section and is fashoned with conventional threads 152 at one end thereof operable to securely connect with a drill colar, not shown, and form a part of the drill collar. The first annular sub member 150 is provided with an interconnecting structure 154 at the other end thereof.

As seen more clearly in the enlarged segmental view of FIG. 6 the interconnecting structure 154 is composed of thread-like members which are generally sinusoidal in cross-section; having a continuously curved outer surface.

A second annular sub member 156 operably forms a part of the drill collar sub and is provided with an interconnecting structure 158 at one end thereof. The 158 elements are operable to structurally cooperate and interengage with elements 154. In this connection the interconnecting structure 158 is composed of thread-like members which are generally sinusoidal in cross-section; having a continuously curved outer surface.

The interconnecting sinusoidal structures 154 and 158 are dimensioned to structurally interfere but concomitantly form mutually opposing surfaces which are contiguous but spaced from one another to form a generally uniform gap 160. The gap 160 is filled with a dielectric material 162 such as a resin composition chosen for its dielectric and low extrusion properties.

An annular disc 164 is coaxially positioned about the sub member 156 and forms a bearing means between the first annular sub member 150 and the second annular sub member 156. In order to maintain the electrical isolaton of the first member 150 with respect to the second 156 the bearing disc 164 is coated on at one surface with a dielectric material 166. In a preferred form the disc 164 is coated completely with dielectric material.

In the first embodiment of the invention, as depicted in FIG. 5, it will be seen that a third annular sub member 170 is disclosed wherein one end is operable to be connected, by screw threads 172, directly onto a drill collar. The other end of the sub member 170 is fashioned with generaly sinusoidal thread-like elements 174 which are operable to interengage with compatible generally sinusoidal thread-like elements 176 on the other end of the second annular sub member 156.

As previously discussed in connection with similar elements 154 and 158 the interconnecting elements 174 and 176 are dimensioned to structurally interfere but concomitantly form mutually opposing surfaces which are contiguous but spaced from one another to form a generally uniform gap 178.

The gap 178 is filled with a dielectric material suitable to withstand compression loads without extruding while providing a desired degree of electrical isolation.

An annular disc 180 is coaxially positioned about the third sub structure 170 and forms a bearing means between the second annular sub member 156 and the third annular sub member 170. The disc 180 is coated on at least one surface with a dielectric material 182. In a preferred form the disc 180 is coated compeltely with dielectric material.

In order to insure electrical isolation the second annular sub member is preferably completely coated inside and out with a dielectric composition.

Turning now to FIGS. 7 and 8 there will be seen views of a second preferred embodiment of the invention. In a manner similar to the first embodiment of the invention the second embodiment includes a first annular sub member 188 which has a conventional threaded portion 190 to connect one end of the first annular sub to a drill collar.

Interconnecting structures 192 are formed at the other end of the first sub member 188. These structures comprise sinusoidal thread-like members in cross-section, note FIG. 8, and are dimensioned to interfit with similar thread-like structures 194 on a corresponding portion of a second annular sub member 196.

The thread-like elements 192 and 194 are dimensioned to form a generally uniform gap which is filled with a dielectric composition 198.

A bearing disc 200 is fitted between the first and second annular sub members at the outer peripheries thereof. This disc is coated with a dielectric composition 202 to insure the electrical isolation character of the gap sub assembly while permitting the assembly to carry large compressive loads.

A peripheral recess 204 is cut into the surface of the first and second annular sub members at the outer peripheral interface of the first and second annular sub membrs 188 and 196 respectively. A dielectric sheath 206 is fitted into the peripheral recess about the interface thus furthering the electrical isolation integrity of the assembly.

Figure 9:
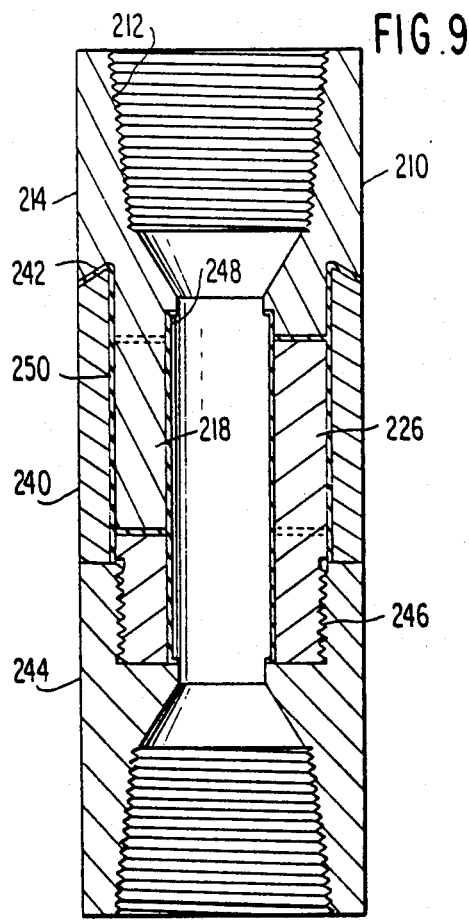
FIG. 9 is a sectional side view of an insulated gap sub assembly in accordance with a third preferred embodiment of the invention.
Figure 10:
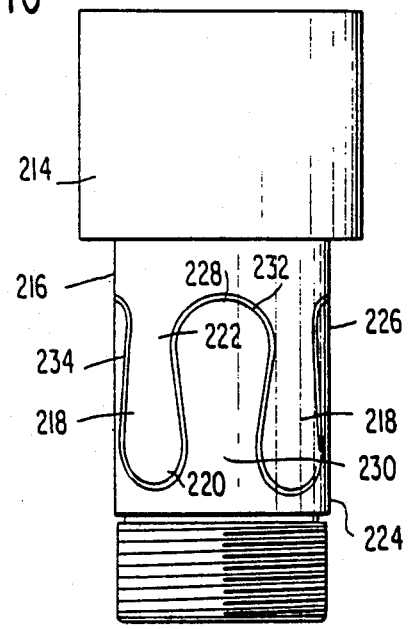
FIG. 10 is a side view of internal elements of the insulated gap sub assembly depicted in FIG. 9.

Referring to FIGS. 9 and 10 there will be seen a third embodiment of the subject invention. In this embodiment a first annular sub member 210 has a conventional thread portion 212 operable to connect directly to a drill collar. The first annular sub member incudes a generally cylindrical base portion 214 and an axially elongate portion 216 fashioned with a plurality of axially extending arms 218. These arms are symetrically positioned about a central longitudinal access of the first annular sub member. Each of the arms 218 is provided with a head portion 220 and a base portion 222. The circumferential dimension of the head portion is the greater than the circumferential dimension of the base as depicted in FIG. 10.

The third embodiment of the subject invention includes a second annular sub member 224. This member includes an axially elongate portion having a plurality of axially extending arms 226 which are symetrically positioned about a central longitudinal axis of the second annular sub member 224. Each of the axially extending arms includes a head portion 228 and a base portion 230. The circumferential dimension of the head portion is greater than the circumferential dimension of the base portion and the head and base portions of the first annular sub member are compatibly dimensioned with respect to the head and base portions of the second annular sub member wherein said portions are operable to interengage while forming a generally uniform gap 232 along mutually opposing surfaces. The gap 232 is filled with a dielectric material 234 which is operable to electrically isolate the first annular sub member from the second annular sub member.

As seen in FIG. 10 the diameter of the base portion 214 of the first annular sub member 210 is greater than the diameter of the second annular sub member 224. A bearing member between the two annular sub members is provided which includes an external cylindrical sleeve 240. The sleeve 240 surrounds the axially elongate portion of the first annular sub member and the second annular sub member and operably abuts at one end thereof against the base portion 214 of the first annular sub member 210. This abutting contact is electrically isolated by an annular dielectric disc 242, note FIG. 9. The bearing member of the third embodiment further includes a retainer which operably abutts against the other end of the external cylindrical sleeve and is releasably connected to the free end of the second annular sub member 224 by a conventional threaded connection 246.

In order to insure electrical isolation of the subject drill collar gap sub a sleeve of dielectric material 248 is coaxially positioned within the first and second annular sub members and axially extends along the interior surface and arms of said members. In addition a second sleeve 250 is coaxially positioned about the exterior surface of said first and second annular sub members and axially extends along the exterior surface of the interconnecting arms of said members.

Figure 12:
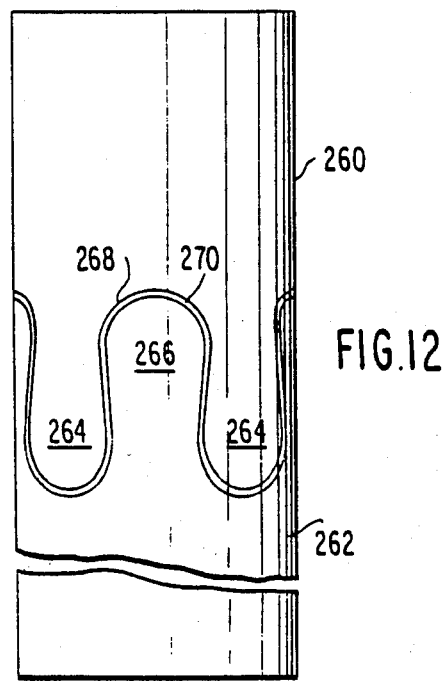
FIG. 12 is a side exterior view of the insulated gap sub assembly depicted in FIG. 11.
Figure 11:
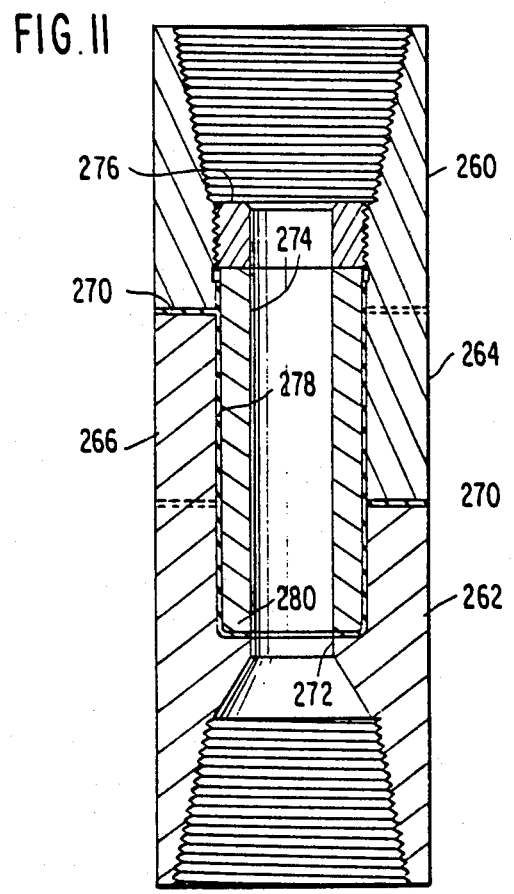
FIG. 11 is a sectional side view of an insulated gap sub assembly in accordance with a fourth preferred embodiment of the invention.

Turning now to FIGS. 11 and 12 there will be seen yet a forth embodiment of the invention. This embodiment includes a first annular sub member 260 and a second annular sub member 262. Each of the annular sub members includes axially extending arms 264 and 266 which interconnect as depicted in FIG. 12 and as previously discussed in connection with FIGS. 9 and 10. The arms are dimensioned to be spaced to form a generally uniform gap 268. This gap is filled with an electrical isolation dielectric material 270.

In this embodiment of the invention an internal flange 272 is formed within the second annular sub member 262 and the bearng member comprises an internal cylindrical sleeve 274 which abuts at one end against the flange 272. The sleeve 274 coaxially extends along the interior surface of the interconnecting arms of the first and second annular sub members and a retaining member 276 is threaded onto the first annular sub memer 260 and abuts against the other end of the internal cylindrical sleeve. In order to maintain the electrical isolation of the subject drill collar gap sub a sleeve of dielectric material 278 coaxially surrounds the exterior surface of the cylindrical sleeve 274 and abuts against the interior surface of the interconnected arms of the first and second annular sub members 260 and 262. As seen in FIG. 11 an end most portion of the dielectric sleeve 278 wraps around the base of the internal cylindrical sleeve 274 at 280 to electrically isolate the internal cylindrical sleeve 274 from the second annular sub member 262.

Figure 13:
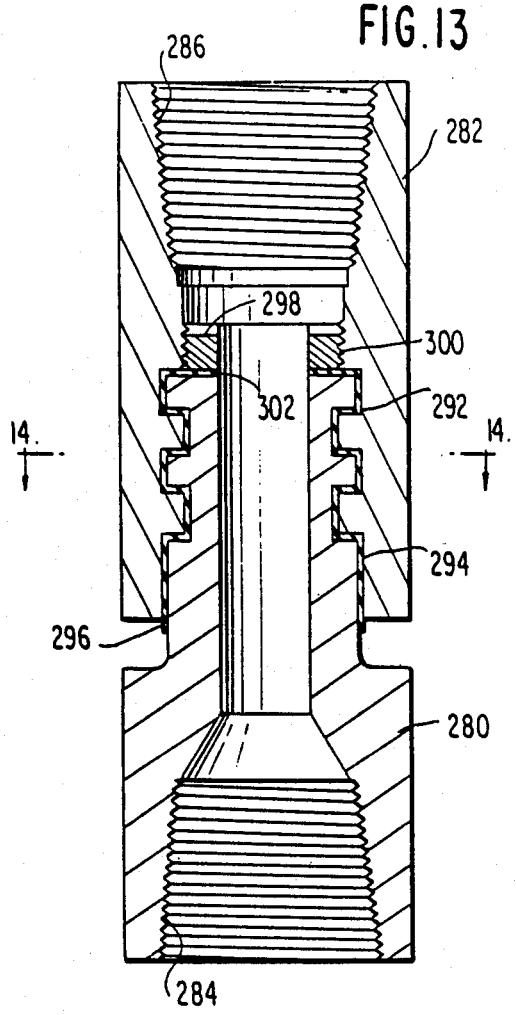
FIG. 13 is a sectional side view of an insulated gap sub assembly in accordance with a fifth preferred embodiment of the invention.
Figure 14:
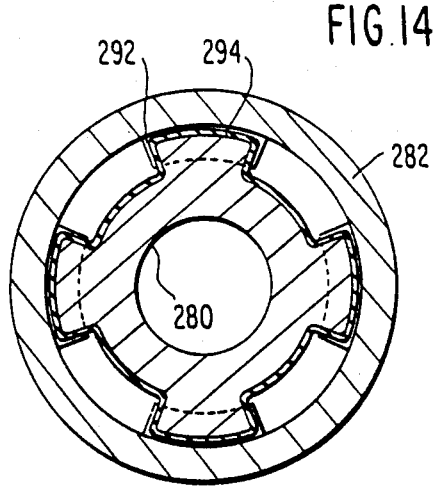
FIG. 14 is a cross-sectional view taken along section line 13—13 in FIG. 13.
Figure 15:
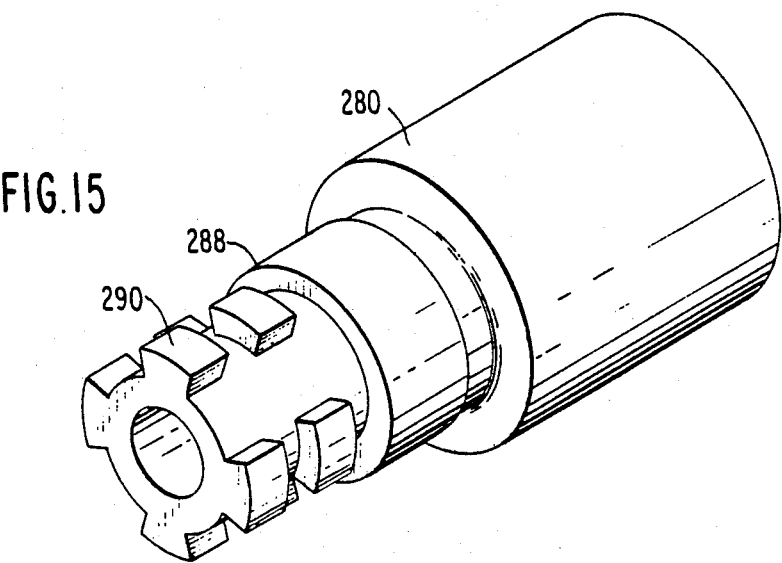
FIG. 15 is an axonometric view of a male member of the insulated sub assembly depicted in FIG. 13.

Finally referring to FIGS. 13-14 there is depicted yet a fifth embodiment of the subject invention which includes a first annular sub member 280 and a second annular sub member 282. These members are provided with threaded connections 284 and 286 respectively to directly connect the isolation sub gap assembly into a conventional drill collar. The first annular sub member 280 is fashioned with a cylindrical extension 288 having an exterior castellated surface as at 290. The second annular sub member 282 is fashioned with a cooperating recessed castellated surface 292 such that locking interengagement between the first and second annular sub members may be provided by sliding the 288 into member 292 and rotating the assembly a quarter turn.

The castellated surfaces are dimensioned to be mutually contiguous but spaced to provide a generally uniform gap 294 between the first and second annular sub members 280 and 282. This gap is filled with a dielectric material 296 which selected for its property to withstand compressive loads as well as providing dielectric isolation.

The bearing member for the fifth embodiment of the invention comprises a collar member 298 which operably abuts against a free end of the first annular sub member 280 and is releasably connected to the interior surface of the second annular sub member 282 by a conventional threaded coupling 300. An annular disc of dielectric material 302 is placed between the collar member 298 and the free end of the first annular sub member to insure the existence of electrical isolation between the first and second annular sub members.

In a preferred embodiment it is presently envisioned that high strength metals will be utilized for the structural members such as various steel alloys. It is possible that in some instances, however other materials will be suitable to provide the strength required of an element in a drill collar such as: fiber composites, thermosetting plastics, resin injected wood, etc.

SUMMARY OF MAJOR ADVANTAGES OF THE INVENTION

After reviewing the foregoing description of preferred embodiments of the invention, in conjunction with the drawings, it will be appreciated by those skilled in the art that several distinct advantages are obtained by the subject invention.

Without attempting to detail all of the desirable features specifically and inherently set forth above, a major advantage of the invention is the provision of an insulated drill collar gap sub assembly for a toroidal coupled telemetry system wherein normal functioning of the drill collar is maintained. At the same time transmission of large quantities of real time data to the surface is achieved by electromagnetically coupling a primary toroid winding carrying the data to the surface utilizing the drill string and drill collar as a secondary.

The subject insulated gap sub assemblies permit the foregoing data transmission because of the electrical isolation provided thereby and thus elimination or minimizing the possibility of providing a secondary short turn within the system.

The subject drill gap sub embodiments each disclose singularly rugged inner connecting structures which are mutually contiguous but spaced from one another to provide a generally uniform annular gap which is filled with a dielectric material. The interconnecting structures of the subject invention carry the mechanical loads of the collar by distributing such loads throughout the interconnecting structure thus minimizing potential to rupture the dielectric material within the annular gaps. In each case axial bearing members are provided to facilitate the transmission of force through the gap sub assembly and further protect the dielectric material from extrusion.

In describing the invention, reference has been made to preferred embodiments. Those skilled in the art, however, and familiar with the disclosure of the subject invention, may recognize additions, deletions, modifications, substitutions and/or other changes which will fall within the purview of the subject invention as defined in the claims.

We claim:

1. An insulated drill collar gap sub for a toroidal coupled telemetry system comprising:
   a first annular sub member operable to be connected at one end to a drill collar and from a part of the drill collar,
   said first annular sub member having an interconnecting structure formed at the other end thereof;
   a second annular sub member operable to form a part of a drill collar sub,
   said second annular sub member having an interconnecting structure formed at one end thereof operable to structurally ooperate and interengage with said interconnecting structure formed at the other end of said first annular sub member;

said interconnecting structure formed at the other end of said first annular sub member and said interconnecting structure formed at said one end of said second annular sub member being dimensioned to be mutually contiguous but spaced when said first annular member is structurally interengaged and extending to longitudinally interfere with said second annular member while simultaneously forming a generally uniform spaced between said first and second annular sub members;

dielectric material positioned within and occupying the void of said generally uniform spacing between the interengaged surfaces of said first annular sub member and said second annular sub member to form a connection of structural integrity and concomitant electrical isolation;

bearing means positioned between said first annular sub member and said second annular sub member to cooperate with said interconnecting structure of said first annular sub member and said second annular sub member to form a load bearing insulated drill collar sub of enhanced structural integrity;

a third annular sub member operable to be connected at one end to a drill collar and form a part of the drill collar,
said third annular sub member having an interconnecting structure formed at the other end thereof;

said second annular sub member having an interconnecting structure formed at the other end thereof operable to structurally cooperate and interengage with said interconnecting structure formed at the other end of said third annular sub member;

said interconnecting structure formed at the other end of said third annular sub member and said second annular sub member being dimensioned to be mutually contiguous but spaced when said second annular member is structurally interengaged and extending to longitudinally interfere with said third annular member while simultaneously forming a generally uniform space between said second and third annular sub members;

dielectric material positioned within and occupying the void of said generally uniform space between the interengaged surfaces of said second annular sub member and said third annular sub member to form a connection of structural integrity and concomitant electrical isolation; and bearing means positioned between said second annular sub member and said third annular sub member to cooperate with said interconnecting structure of said second annular sub member and said third annular sub member to form a load bearing insulated drill collar sub of enhanced structural integrity.

2. An insulated drill collar gap sub for a toroidal coupled telemetry system as defined in claim 1 wherein:
said bearing means positioned between said first annular sub member and said second annular sub member comprises a first annular disc axially positioned between an outer peripheral portion of said first annular sub member and an outer peripheral portion of said second annular sub member; and said bearing means positioned between said second annular sub member and said third annular sub member comprises a second annular disc axially positioned between an outer peripheral portion of said second annular sub member and an outer peripheral portion of said third annular sub member.

3. An insulated drill collar gap sub for a toroidal coupled telemetry system as defined in claim 2 wherein:
said first and second annular disc members are each coated with a dielectric material.

4. An insulated drill collar gap sub for a toroidal coupled telemetry system as defined in claims 22 or 2 wherein said interconnecting structure of said first and second annular sub members and said second and third annular sub members each comprises:
sinusoidal shaped, threadlike structures which structurally interengage.

5. An insulated drill collar gap sub for a toroidal coupled telemetry system as defined in claim 1 wherein:
said second annular sub member has an internal bore and the entire interior and exterior surface area of said second annular sub member is coated with a dielectric material.

6. An insulated drill collar gap sub for a toroidal coupled telemetry system comprising:
a first annular sub member operable to be connected at one end to a drill collar and form a part of the drill collar,
said first annular sub member having an interconnecting structure formed at the other end thereof;

a second annular sub member operable to form a part of a drill collar sub,
said second annular sub member having an interconnecting structure formed at one end thereof operable to structurally cooperate and interengage with said interconnecting structure formed at the other end of said first annular sub member;

said interconnecting sructure formed at the other end of said first annular sub member and said interconnecting structure formed at said one end of said second annular sub member being dimensioned to be mutually contiguous but spaced when said first annular member is structurally interengaged and extending to longitudianlly interfere with said second annular member while simultaneously forming a generally uniform space between said first and second annular sub members, said interconnecting structures comprise
sinusoidal shaped, threadlike structures which structurally interengage;

dielectric material positioned within and occupying the void of said generally uniform spacing between the interengaged surfaces of said first annular sub member and said second annular sub member to form a connection of structural integrity and concomitant electrical isolation;

bearing means positioned between said first annular sub member and said second annular sub member to cooperate with said interconnecting structure of said first annular sub member and said second annular sub member to form a load bearing insulated drill collar sub of enhanced structural integrity;

a peripheral recess cut into the surface of said first annular sub member and said second annular sub member at the outer peripheral interface of said first and second annular sub members; and a dielectric sheath fitted into said peripheral recess about the interface, said sheath being joined to said dielectric material between the structurally interengaged first and second annular sub members to provide an electrical isolation assmbly of enhanced electrical isolation integrity.

7. An insulated drill collar gap sub for a toroidal coupled telemetry system comprising:
   a first annular sub member operable to be connected at one end to a drill collar and form a part of the drill collar,
      said first annular sub member having an interconnecting structure formed at the other end thereof;
   a second annular sub member operable to form a part of a drill collar sub,
      said second annular sub member having an interconnecting structure formed at one end thereof operable to structurally cooperate and interengage with said interconnecting structure formed at the other end of said first annular sub member;
   said interconnecting structure of said first annular sub member having a base portion and an axially elongate portion, said axially elongate portion being fashioned with a plurality of axially extending arms symmetrically positioned about a central longitudinal axis of said first annular sub member, said arms having
      a head portion, and
      a base portion, wherein the circumferential dimension of said head portion is greater than the circumferential dimension of said base portion;
   said interconnecting structure of said second annular sub member comprises an axially elongate portion and being fashioned with a plurality of axially extending arms symmetrically positioned about a central longitudinal axis of said second annular sub member said arms having
      a head portion, and
      a base portion, wherein the circumferential dimension of said head portion is greater than the circumferential dimension of said base portion; and
   said head and base portions of said first annular sub member being compatibly dimensioned with respect to said head and base portions of said second annular sub member wherein the head portions of said first annular sub members interengage within the gaps between adjacent base portions of said second annular sub member and the arm had portions of said second annular sub member interengage within the gaps between adjacent base portions of said first annular sub member;
   said interconnecting structure formed at the other end of said first annular member and said interconnecting structure formed at said one end of said second annular sub member being dimensioned to be mutually contiguous but spaced when said first annular member is structurally interengaged with said second annular member thus forming a generally uniform spacing between said first and second annular sub members;
   dielectric material positioned within and occupying the void of said generally uniform spacing between the interengaged surfaces of said first annular sub member and said second annular sub member to form a connection of structural integrity and concomitant electrical isolation;
   the diameter of said base portion of said first annular sub member is greater than the diameter of said second annular sub member and said axially elongate portion of said first annular sub member; and
   bearing means positioned between said first annular sub member and said second annular sub member comprising,
      an external cylindrical sleeve surrounding said axial elongate portion of said first annular sub member and said second annular sub member and operably abutting at one end thereof against the base portion of said first annular sub member, and
      a retainer member abutting against the other end of said external cylindrical sleeve and being releasably connected to an exterior portion of said second annular sub member wherein said bearing means cooperates with said interconnecting structure of said first annular sub member and said second annular sub member to form a load bearing insulated drill collar sub of enhanced structural integrity.

8. An insulated drill collar gap sub for a toroi coupled telemetry system as defined in claim 7 and further comprising:
   dielectric material positioned between the interior surface of said external cylindrical sleeve and the corresponding exterior surfaces of said first and second annular sub members.

9. An insulated drill collar gap sub for a toroidal coupled telemetry system as defined in claim 8 and further comprising:
   a sleeve of dielectric material coaxially positioned within said first and second annular sub members and axially extending along the interior surface of the interconnected arms of said first and second annular sub members.

10. An insulated drill collar gap sub for a toroidal coupled telemetry system comprising:
   a first annular sub member operable to be connected at one end to a drill collar and form a part of the drill collar,
      said first annular sub member having an interconnecting structure formed at the other end thereof;
   a second annular sub member operable to form a part of a drill collar sub,
      said second annular sub member having an interconnecting structure formed at one end thereof operable to structurally cooperate and interengage with said interconnecting structure formed at the other end of said first annular sub member;
   said interconnecting structure of said first annular sub member having a base portion and an axially elongate portion, said axially elongate portion being fashioned with a plurality of axially extending arms symmetrically positioned about a central longitudinal axis of said first annular sub member, said arms having
      a head portion, and
      a base portion, wherein the circumferential dimension of said head portion is greater than the circumferential dimension of said base portion;
   said interconnecting structure of said second annular sub member comprises an axially elongate portion and being fashioned with a plurality of axially extending arms symmetrically positioned about a central longitudinal axis of said second annular sub member said arms having
      a head portion, and a base portion, wherein the circumferential dimension of said head portion is greater than the circumferential dimension of said base portion; and said head and base portions of said first annular sub member being compatibly dimensioned with respect to said head and base portions of said second annular sub member wherein the head portions of said first annular sub members interengage within the gaps between adjacent base portions of said second annular sub member and the arm head portions of said second annular sub member interengage within the gaps between adjacent base portions of said first annular sub member;

said interconnecting structure formed at the other end of said first annular member and said interconnecting structure formed at said one end of said second annular sub member being dimensioned to be mutually contiguous but spaced when said first annular member is structurally interengaged with said second annular member thus forming a generally uniform spacing between said first and second annular sub members;

dielectric material positioned within and occupying the void of said generally uniform spacing between the interengaged surfaces of said first annular sub member and said second annular sub member;

an internal flange is integrally formed within said second annular sub member; and bearing means positioned between said first annular sub member and said second annular sub member comprising,
- an internal cylindrical sleeve abutted against said internal flange and coaxially extending along the interior surface of the interconnected arms of said first and second annular sub members, and
- a retainer member abutting against the other end of said internal cylindrical sleeve and being releasably connected to an interior portion of said first annular sub member wherein a load bearing insulated drill collar sub is formed of enhanced structural integrity.

11. An insulated drill collar gap sub for a toroidal coupled telemetry system as defined in claim 10 and further comprising:

a sleeve of dielectric material generally co-extensive with said internal cylindrical sleeve and positioned between the exterior surface of said internal cylindrical sleeve and the interior surface of the interconnected arms of said first and second annular sub members.

12. An insulated drill collar gap sub for a toroidal coupled telemetry system comprising:

a first annular sub member operable to be connected at one end to a drill collar and form a part of the drill collar,
said first annular sub member having an interconnecting structure formed at the other end thereof;

a second annular sub member operable to form a part of a drill collar sub
said second annular sub member having an interconnecting structure formed at one end thereof operable to structurally cooperate and interengage with said interconnecting structure formed at the other end of said first annular sub member;

said interconnecting structure of said first annular sub member comprises a male member having an exterior castellated surface;

said interconnecting structure of said second annular sub member comprises a female member having an interior castellated surface and being dimensioned to the interengage with said corresponding castellated surface of said male member;

said interconnecting structure formed at the other end of said first annular member and said interconnecting structure formed at said one end of said second annular sub member being dimensioned to be mutually contiguous but spaced when said first annular member is structurally interengaged with said second annular member thus forming a generally uniform spacing between said first and second annular sub members;

dielectric material positioned within and occupying the void of said generally uniform spacing between the interengaged surfaces of said first annular sub member and said second annular sub member to form a connection of structural integrity and concomitant electrical isolation; and bearing means positioned between said first annular sub member and said second annular sub member, said bearing means comprising,
- a collar member operably abutting against a free end of said first annular sub member and being releasably connected to an interior surface of said second annular sub member, and
- an annular disc of dielectric material positioned between the free end of said first annular sub member and said collar member.

13. An insulated drill collar gap sub for a toroidal coupled telementary system comprising:

a first annular sub member operable to be connected at one end to a drill collar and form a part of the drill collar,
said first annular sub member having an interconnecting structure formed at the other end thereof;

a second annular sub member operable to form a part of a drill collar sub,
said second annular sub member having an interconnecting structure formed at one end thereof operable to structurally cooperate and interengage with said interconnecting structure formed at the other end of said first annular sub member;

said interconnecting structure formed at the other end of said first annular sub member and said interconnecting structure formed at said one end of said second annular sub member being dimensioned to be mutually contiguous but spaced when said first annular member is structurally interengaged and extending to longitudinally interfere with said second annular member while simultaneously forming a generally uniform space between said first and second annular sub members;

dielectric material positioned within and occupying the void of said generally uniform spacing between the intergaged surfaces of said first annular sub member and said second annular sub member to form a connection of structural integrity and concomitant electrical isolation;

said interconnecting structure of said first and second annular sub members comprises sinusoidal-shaped, thread-like structures which structurally interengage; and bearing means, coated with a dielectric, positioned between said first annular sub member and said second annular sub member to cooperate with said interconnecting structure of said first annular sub member and said second annular sub member to form a load bearing, insulated drill collar sub of enhanced structural integrity.

* * * * *